(12) United States Patent
Zavesky et al.

(10) Patent No.: US 10,797,960 B2
(45) Date of Patent: Oct. 6, 2020

(54) GUIDED NETWORK MANAGEMENT

(71) Applicant: AT&T Intellectual Property I, L.P., Atlanta, GA (US)

(72) Inventors: Eric Zavesky, Austin, TX (US); Ryan Cullinane, Paramus, NJ (US); Russell Fischer, Bernardsville, NJ (US); Mary Keefe Hirsekorn, Mt. Arlington, NJ (US); Jeffrey Stein, Cliffwood, NJ (US); Paul Triantafyllou, Watchung, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 320 days.

(21) Appl. No.: 15/852,017

(22) Filed: Dec. 22, 2017

(65) Prior Publication Data

US 2019/0199599 A1 Jun. 27, 2019

(51) Int. Cl.
*G06F 15/173* (2006.01)
*H04L 12/24* (2006.01)
*H04L 12/26* (2006.01)

(52) U.S. Cl.
CPC .......... *H04L 41/16* (2013.01); *H04L 41/0672* (2013.01); *H04L 41/0645* (2013.01); *H04L 41/145* (2013.01); *H04L 41/22* (2013.01); *H04L 43/0823* (2013.01)

(58) Field of Classification Search
CPC .......................... H04L 41/16; H04L 41/0672
See application file for complete search history.

(56) References Cited

U.S. PATENT DOCUMENTS

| 8,370,466 | B2 | 2/2013 | Verma et al. | |
| 2014/0201836 | A1* | 7/2014 | Amsler | H04L 63/1425 726/23 |
| 2016/0149811 | A1 | 5/2016 | Roch et al. | |
| 2017/0048008 | A1 | 2/2017 | Yi | |
| 2017/0134218 | A1 | 5/2017 | Zhao | |
| 2017/0168690 | A1 | 6/2017 | Kirk et al. | |
| 2017/0223046 | A1* | 8/2017 | Singh | H04L 43/062 |
| 2017/0223530 | A1 | 8/2017 | Marquardt et al. | |
| 2017/0289060 | A1 | 10/2017 | Aftab et al. | |

* cited by examiner

*Primary Examiner* — Hua Fan
(74) *Attorney, Agent, or Firm* — Hartman & Citrin LLC

(57) ABSTRACT

The concepts and technologies disclosed herein are directed, in part, to a system that can monitor traffic traversing a virtualized network that includes a plurality of virtual network functions ("VNFs") that provide, at least in part, a service. The system can capture an event from the traffic. The event can involve at least one VNF, and can negatively affect at least one operational aspect of the virtualized network in providing the service. The system can create snapshot that represents a network state of the virtualized network during the event. The system can create, based upon the snapshot, a shadow network. The shadow network can include a network emulation of the network state of the virtualized network during the event. The system can determine, from the shadow network, at least one modification to at least a portion of the virtualized network that would at least mitigate negative effects of the event.

12 Claims, 9 Drawing Sheets

GUIDED NETWORK MANAGEMENT

BACKGROUND

Network functions virtualization ("NFV") is a new technology initiative that aims to move traditional and evolving mobility networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware.

Software-defined networking ("SDN") is an architectural framework for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits. SDN can allow for the creation of multiple virtual network control planes on common hardware. SDN can help extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

Combining SDN and NFV functionality, such as in Domain 2.0, available from AT&T, provides a highly complex and dynamic set of relationships between virtual, logical, and physical resources. Networks, such as embodied in Domain 2.0 deployments, provide intelligent software systems and applications operating on general purpose commodity hardware (e.g., COTS). This will not only drive down capital expenditure, ongoing operational costs, and help to configure a network with less human intervention, but will also create significant opportunities to scale and monetize existing and new intelligent services.

Within service providers, such as AT&T, orchestration systems like control, orchestration, management, and policy ("ECOMP") were created to dramatically reduce monotonous tasks and monitoring required by human operators through data-based analytics. Current orchestration systems often incite frustration among operators due to over-complicated network status readouts, non-specific network manipulations automatically performed by the orchestration system, and the inability to quickly "revert" changes caused by such manipulations.

SUMMARY

Concepts and technologies disclosed herein are directed to guided network management. According to one aspect of the concepts and technologies disclosed herein, a guided network management system can monitor traffic traversing a virtualized network. The virtualized network can include a plurality of VNFs that provide, at least in part, a service. The guided network management system can capture an event from the traffic. The event can involve at least one VNF of the plurality of VNFs, and can negatively affect at least one operational aspect of the virtualized network in providing the service. The guided network management system can create snapshot of the virtualized network. The snapshot can represent a network state of the virtualized network during the event. The guided network management system can create, based upon the snapshot, a shadow network. The shadow network can include a network emulation of the network state of the virtualized network during the event. The guided network management system can determine, from the shadow network, at least one modification to at least a portion of the virtualized network that would mitigate the event from negatively affecting the operational aspect of the virtualized network in providing the service.

In some embodiments, the service is provided to at least one user device, and the event further involves the user device. Moreover, the snapshot can further represent a user device state of the user device during the event. In these embodiments, the guided network management system can create a user device emulation based upon the user device state. The user device emulation can be deployed in the shadow network such that emulated traffic flows that involve data to/from the user device emulation are indicative of the traffic flows that occurred in the virtualized network during the event.

In some embodiments, the guided network management system can determine, from the shadow network, the modification(s) to at least the portion of the virtualized network, at least in part, by performing one or more A/B tests. During an A/B test, the shadow network emulating the virtualized network in the network state can be compared to the shadow network emulating the virtualized network in a modified network state that represents the network state of the virtualized network during the event as modified by the modification(s).

In some embodiments, the guided network management system can present, via a graphical user interface ("GUI"), a selectable option of a plurality of selectable options. Each of the plurality of selectable options, including the selectable option, can identify one or more possible modifications to at least the portion of the virtualized network that would at least mitigate the event from negatively affecting the operational aspect of the virtualized network in providing the service. The selectable option, in these embodiments, specifically identifies the modification(s) determined by the guided network management system based upon the shadow network. The guided network management system can receive, via the GUI, a selection of the selectable option from the plurality of selectable options. In response to receiving the selection, the guided network management system can instruct an NFV platform to deploy, at least in part, the modification in the virtualized network. In some embodiments, the guided network management system can create a further snapshot of the virtualized network after deployment of the modification(s) to the virtualized network. The further snapshot can be created as part of a post-modification analysis performed by the guided network management system to check whether the modification(s) at least mitigated any negative effects caused by network conditions similar to or the same as those experienced by the virtualized network during the event.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to guided network management. The concepts and technologies disclosed herein provide a guided network management system that can execute actions on behalf of one or more network operators while simultaneously guiding operator choices with informative readouts and explanations of the consequences of such actions. The guided network management system can provide several unique contributions to typical orchestration and operator guidance. The guided network management system can capture and correlate network events based upon network traffic experienced by an in-production network for emulation of end-to-end flows. The guided network management system can provide an automated evaluation and post-modification monitoring of changes with A/B testing and with optional reversion depending upon results of action execution. The guided network management system can provide a GUI that presents estimated implications and allows operators to conduct detailed root-cause analysis of network events.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
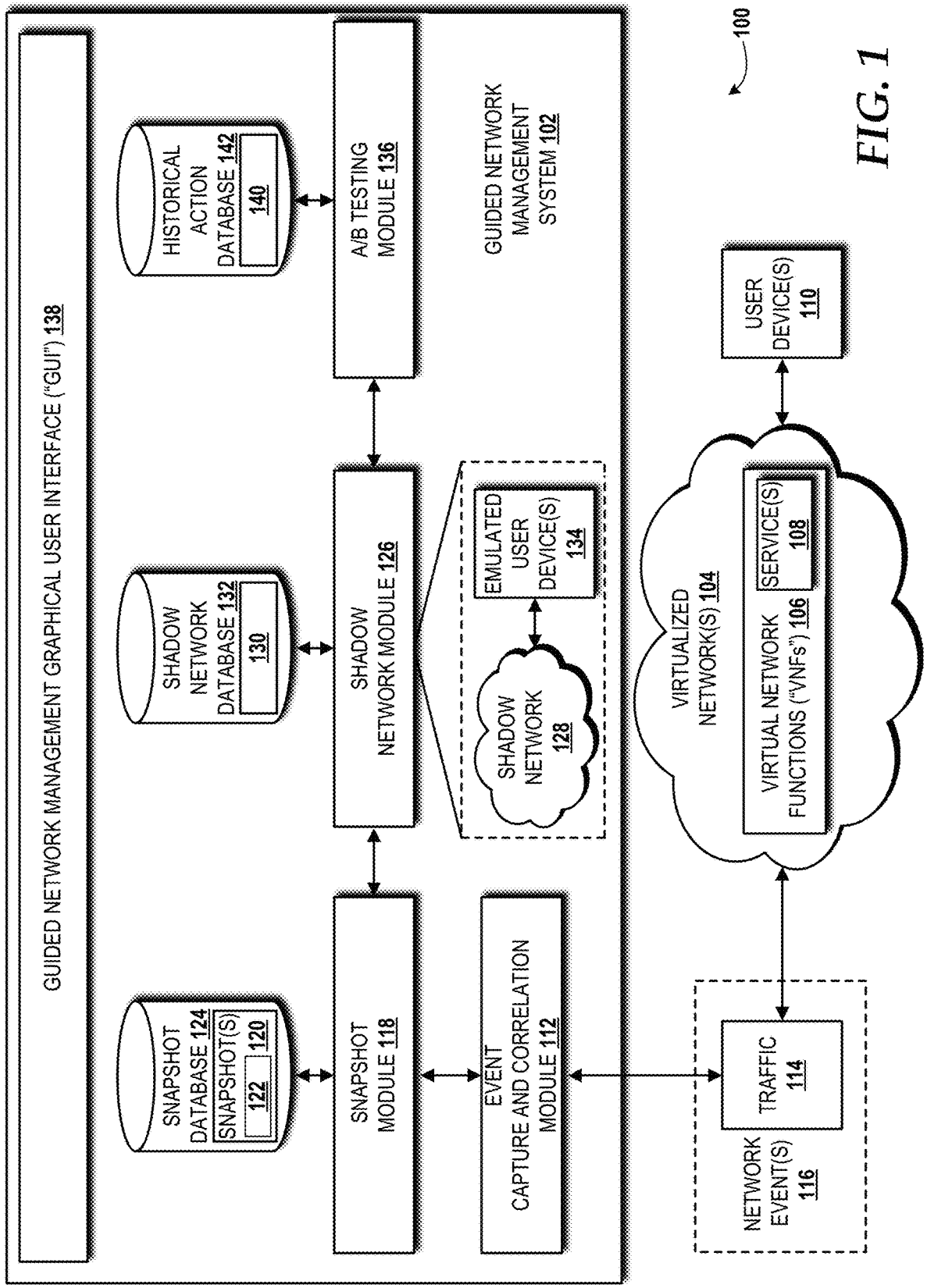
FIG. 1 is a block diagram illustrating aspects of an illustrative operating environment in which the various concepts and technologies disclosed herein can be implemented.

Referring now to FIG. 1, aspects of an illustrative operating environment 100 in which the various concepts and technologies disclosed herein can be implemented will be described. The illustrated operating environment 100 includes a guided network management system 102 designed to manage one or more virtualized networks 104. The illustrated virtualized network 104 includes one or more VNFs 106 that provide, at least in part, one or more services 108 to one or more user devices 110.

The virtualized network 104 is an intelligent network that is programmable, application-aware, and more open than traditional networks. By using the virtualized network 104 as part of a network implementation based upon SDN, network service providers can provide an agile and cost-effective communications platform for handling dramatic increases in data traffic by providing a high degree of scalability, security, and flexibility. The concept of SDN-based networks, such as the virtualized network 104, provides several benefits over traditional networks. SDN allows for the creation of multiple virtual network control planes on common hardware (best shown in FIG. 3). SDN can help extend service virtualization and software control into many existing network elements in a hybrid SDN configuration. It should be understood that the virtualized network 104 is described as pure virtualized network (i.e., no traditional network elements, such as physical network functions), although the concepts and technologies disclosed herein can be employed for hybrid SDN-based networks that include both virtualized and non-virtualized network elements. SDN enables the guided network management system 102 to request and manipulate the services 108 provided, at least in part, by the virtualized network 104, and to allow the virtualized network 104 to expose network states back to the guided network management system 102. SDN can expose network capabilities through one or more application programming interfaces ("APIs") (not shown), making the control of network equipment remotely accessible and modifiable via third-party software clients using open protocols such as OPENFLOW, available from Open Networking Foundation ("ONF").

The VNFs 106 can include virtualizations of any PNF or combination of PNFs provided by a traditional, non-virtualized network. For example, the VNFs 106 can form, at least in part, the virtualized network 104 to provide the services 108 previously provided by a traditional wired or wireless network (including mobile telecommunications networks), wide area networks ("WANs"), local area networks ("LANs"), "area" networks of other breadth, data center networks, combinations thereof, and the like. As such, the capabilities of the VNFs 106 are not limited to providing the functionality of any particular PNFs for any particular type of network. Although several exemplary VNF types are disclosed herein in context of a mobile telecommunications network (see FIG. 4), this implementation is merely provided as one non-limiting example. Likewise, the services 108 can include any network service, including mobile telecommunications services as the primary, non-limiting example disclosed herein. In this context, the services 108 can include mobile data services, including voice over data services such as voice over long-term evolution ("VoLTE"), like services, and evolutions thereof.

According to various embodiments, the functionality of the user device(s) 110 (referred to hereinafter collectively as user devices 110, or singularly as user device 110) can be provided by one or more server computers, desktop computers, mobile devices, laptop computers, tablet computers, set-top boxes, other computing systems, and the like. It should be understood that the functionality of the user device(s) 110 can be provided by a single device, by two similar devices, and/or by two or more dissimilar devices. For purposes of describing the concepts and technologies disclosed herein, the user device(s) 110 are described herein as mobile devices such as smartphones (see FIG. 7 for example architecture). It should be understood that this embodiment is illustrative, and should not be construed as being limiting in any way.

The guided network management system 102 provides a capability to monitor, on-demand, via an event capture and correlation module 112, traffic 114 associated with one or more network events 116 that occur during operation of the virtualized network 104. In some embodiments, the guided network management system 102 monitors the traffic 114 via one or more network probes. The network probes can be deployed at various locations within the virtualized network 104, such as integrated within one or more of the VNFs 106, provided separately as a standalone network probe VNF of the VNFs 106, hardware probes, software probes, and/or other network monitoring technologies known to those skilled in the art. In some embodiments, one or more of the aforementioned network probes are managed, at least in part, by the event capture and correlation module 112. Alternatively, the network probe(s) can be managed by another component, such as a dedicated network probe management system, which can then communicate with the event capture and correlation module 112 regarding the traffic 114. In some embodiments, the event capture and correlation module 112 can adapt its monitoring capabilities to the dynamic, unpredictable, and fast growth of the traffic 114 to ensure that an acceptable level of throughput for processing the network events 116 is maintained, subject to available hardware host resources (see FIG. 3).

As used herein, a "network event," such as one of the network events 116, is a network occurrence of significance to one or more operational aspects of the virtualized network 104. By way of example, and not limitation, the network event 116 can include capacity utilization (e.g., virtual machine, processor, memory, storage, and/or network I/O) exceeding a designed threshold, failure of network I/O (i.e., communications failure) at devices, or a network topology update. What constitutes a "network event" can be defined by a provider of the virtualized network 104 and/or one or more of the services 108, and accordingly, likely will vary from provider to provider.

The network events 116 can trigger one or more alarms (e.g., faults) and/or one or more notifications (e.g., operations state change) by the event capture and correlation module 112. Alarms and/or notifications can be triggered, for example, if a severity value defined by or for the event capture and correlation module 112 is "major," "critical," or otherwise set so as to trigger an alarm and/or notification. In some embodiments, the event capture and correlation module 112 can receive, from the virtualized network 104, the network event(s) 116 via one or more simple network management protocol ("SNMP") traps from one or more network devices, such as the network probes described above, operating on or in communication with the virtualized network 104. The event capture and correlation module 112 can then associate a severity value to each of the network events 116. The severity values can be established, for example, by a telecommunications carrier (or representative thereof such as a network operator) that utilizes the guided network management system 102 for monitoring operations of the virtualized network 104. The severity values can include a numerical ranking, an alphabetic ranking, an alphanumeric ranking, or some other ranking, such as, for example, informational, warning, major, and critical. Intermediate severity values are also contemplated. Those skilled in the art will appreciate other severity ranking schemes to rank the significance of a network event 116 on operations of the virtualized network 104. Moreover, it is contemplated that the event capture and correlation module 112 can utilize the severity value of a given network event of the network events 116 to determine whether to provide the traffic 114 associated with that given network event to other modules in the guided network management system 102 for further analysis.

The event capture and correlation module 112 can be implemented as a software module that includes instructions for performing the aforementioned operations in response to execution by one or more processors of the guided network management system 102. Alternatively, the event capture and correlation module 112 can itself be a standalone system that includes hardware and software for performing the aforementioned operations. Moreover, the network probes described above can be provided as part of the event capture and correlation module 112 or as separate network elements with which the event capture and correlation module 112 is in communication to receive the traffic 114 associated with the network events 116.

In the illustrated embodiment, the event capture and correlation module 112 operates in communication with a snapshot module 118 to provide the snapshot module 118 with the traffic 114 associated with the network events 116. The snapshot module 118 can create snapshots 120 of the virtualized network 104 in response to the network events 116 captured by the event capture and correlation module 112. As used herein, a "snapshot" 120 represents a network state 122 of the virtualized network 104 during the network event 116.

The network state 122 represents the operational data associated with operations performed by the virtualized network 104 during the network event 116. The operational data can include network performance data that quantifies the quality of service ("QoS") provided by the VNFs 106 of the virtualized network 104 in providing the service(s) 108. The network performance data includes bandwidth measurement data, throughput measurement data, latency measurement data, jitter measurement data, error rate date, combination thereof, and the like. Those skilled in the art will appreciate the numerous other variables that might be considered network performance-related, and as such, the network state 122 represented by the snapshot 120 is intended to encompass any network performance-related variables and/or the traffic flows 114 that a given service provider might use to quantify the QoS provided by the virtualized network 104 with respect to one or more of the services 108 and, possibly, any specific interaction(s) the service(s) 108 have with the network event(s) 116 and the traffic flow(s) 114. The operational data of the network state 122 can additionally or alternatively include hardware utilization measurements, such as virtual machine capacity, processor capacity, memory capacity, storage capacity, network I/O capacity, and/or the like, associated with the hardware resources (best shown in FIG. 3) upon which the VNFs 106 and/or other aspects of the virtualized network 104 operate. The snapshots 120, including the network states 122 associated therewith, can be stored in a snapshot database 124.

In some embodiments, the snapshot module 118 can create the snapshot 120 based upon a network data buffer. The network data buffer can include network data associated with the network event 116 from the start of the network event 116 to the end of the network event 116. It is contemplated that additional buffer before the start time and/or after termination of the network event 116 can be used to capture any effects of the network event 116 on the traffic 114 before and after the network event 116 proper. The additional buffer can be automatically applied based upon historical data associated with one or more events similar to the network event 116 for which the snapshot 120 is created. For example, if a given event type often causes a residual effect that reduces network bandwidth on a particular link or group of links, the guided management system 102 can correlate, via the event capture and correlation module 112, the network event 116 captured to the event types known to the guided network management system 102 based upon previous network analyses to determine the additional buffer needed to capture the residual effect.

The snapshot module 118 can be implemented as a software module that includes instructions for performing the aforementioned operations in response to execution by one or more processors of the guided network management system 102. Alternatively, the snapshot module 118 can itself be a standalone system that includes hardware and software for performing the aforementioned operations.

In the illustrated embodiment, the snapshot module 118 operates in communication with a shadow network module 126 to provide the snapshot 120 for the virtualized network 104 during the network event 116. The shadow network module 126 uses the snapshot 120 to create a shadow network 128. The shadow network 128 includes a network emulation of the network state 122, represented in the snapshot 120, of the virtualized network 104 during the network event 116. A shadow network configuration 130 of the shadow network 128 can be stored in a shadow network database 132, which can store other shadow network configurations for different emulations of the virtualized network 104 during different states of the network states 122 represented in the snapshots 120. In some embodiments, the shadow network module 126 can create the shadow network 128 based upon one or more of the shadow network configurations 130 stored in the shadow network database 132. The shadow network module 126 alternatively can modify an active shadow network configuration (i.e., a particular shadow network configuration currently in-use by the shadow network 128) to emulate the virtualized network 104 in the network state 122. The guided network management system 102 can use the shadow network module 126 to create and maintain multiple shadow networks 128.

In some instances, the network event 116 might directly involve one or more of the user devices 110. For example, the network event 116 might include a failed VoLTE call or data session of which one or more of the user devices 110 was a part. In these instances, the guided network management system 102 can use the shadow network module 126 to create one or more emulated user devices 134 corresponding to the user device(s) 110 that were part of the network event 116. The emulated user device(s) 134 can be implemented as virtualization(s) of the user device(s) 110 running on hardware resources of a NFVP (see FIG. 3 or other COTS hardware). The emulated user device 134 can be created based upon a user device state of the user device 110 during the network event 116. The user device state can be used by the shadow network module 126 to emulate device power state, the operating system (including the correct version) of the user device 110, firmware (e.g., radio firmware), any applications running (in foreground and/or background) on the user device 110 during the network event 116, the signal strength and/or other device-side network measurements, combinations thereof, and the like. The emulated user device 134 can emulate the hardware and software of the user device 110 via a lookup operation of the international mobile equipment identity ("IMEI") of the user device 110 with an IMEI database (not shown), which can be maintained by the provider of one or more of the services 108 to the user device 110.

In some embodiments, the emulated user device 134 is an emulation of a technician device, such as a drive testing device used for testing a mobile telecommunications network, of the user devices 110, and the technician device is not involved in the network event 116. The emulated user device 134, in some other embodiments, can be created based upon one or more user device profiles that typify behavior of the user devices as a collective, including behavior of the user devices 110 responsive to single calls, complex routing, dynamic routing due to call/data session failure, and/or other behavior. The user device profiles can be built upon actual data from the virtualized network 104 about the user devices 110, or can be used to test simulated devices in various states (i.e., not actual observed behavior).

The shadow network module 126 can be implemented as a software module that includes instructions for performing the aforementioned operations in response to execution by one or more processors of the guided network management system 102. Alternatively, the shadow network module 126 can be a standalone system that includes hardware and software for performing the aforementioned operations.

The guided network management system 102 can determine one or more modifications to at least a portion of the virtualized network 104 that would at least mitigate the network event 116 from negatively affecting one or more operational aspects of the virtualized network 104 in providing the service 108 via one or more of the VNFs 106. In this manner, when the traffic 114 again exhibits characteristics the same as or similar to those of the network event 116 captured by the event capture and correlation module 112, the modification(s) should at least mitigate any negative effects on one or more operational aspects of the virtualized network 104 in providing the service 108 via one or more of the VNFs 106. In some embodiments, the guided network management system 102 can determine that the modification(s) are created, at least in part, via a machine learning system (best shown in FIG. 9). The modification(s) can be tweaked, wholly changed, or otherwise manipulated by one or more operators (best shown in FIG. 2) who can interact with the guided network management system 102 via a guided network management GUI 138, which is described in detail below. The operator(s) might also introduce an initial version of a modification that can be tweaked by the machine learning system, if needed.

In some embodiments, the guided network management system 102 can execute an A/B testing module 136 to compare two different shadow network configurations 130 of the shadow network 128 created by the shadow network module 126. Initially, a first shadow network configuration can operate as a baseline representative of the virtualized network 104 during the network event 116. The second shadow network configuration can be the first shadow network configuration with the modification(s) intended to at least mitigate the network event 116 from negatively affecting one or more operational aspects of the virtualized network 104 in providing the service 108 via one or more of the VNFs 106. If the modification(s) are unsuccessful on the shadow network 128, the A/B testing module 136, based upon machine learning and/or through operator input via the guided network management GUI 138, can manipulate the shadow network 128 further via one or more other modifications and/or one or more changes to the initial modification(s). The resultant shadow network configuration can be compared to the first shadow network configuration. After an improvement in the operational aspect(s) of the shadow network 128 that at least mitigate the effects of the network event 116 is observed, the A/B testing module 136 can inject further modifications and compare the resultant shadow network configuration to the most recent configuration that showed improvement. This process can continue until the A/B testing module 136 is satisfied with the shadow network configuration. The A/B testing module 136 can be satisfied with the shadow network configuration in response to an input from the operator via the guided network management GUI 138. Alternatively, the A/B testing module 136 can be satisfied with the shadow network configuration in response to the configuration successfully mitigating the effects of the network event 116 by a pre-defined threshold (e.g., a percentage improvement, which can be set by the operator or otherwise set).

Any actions 140 taken by the A/B testing module 136 and/or one or more operators during A/B testing that yield a successful result—that is, at least mitigating the effects of the network event—can be stored in a historical action database 142. The A/B testing module 136 and likewise the operator(s) can use the actions 140 to determine how to best proceed with determining one or more modifications to a given shadow network based upon a given snapshot of a given network event associated with the virtualized network 104. In this manner, the A/B testing module 136 and/or the operator(s) do not need to redo analyses previously performed for similar network event types. For example, through logging of the actions 140 and observations, the guided network management system 102 can correlate a similar problem or location of a problem solved by a single action—either in the same or a different part of the virtualized network 104 through emulation in the shadow network 128.

Figure 2:
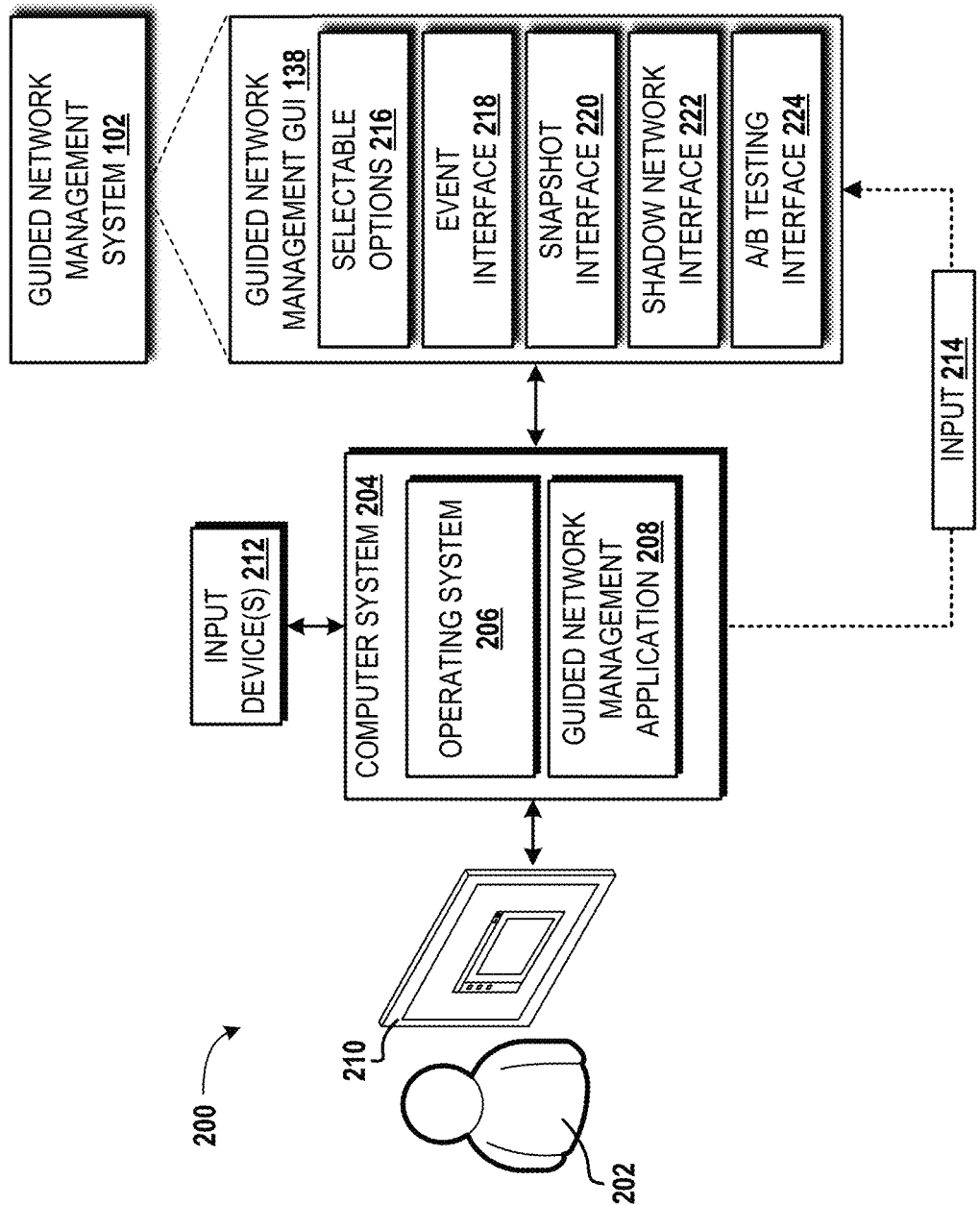
FIG. 2 is a block diagram illustrating aspects of a guided network management user experience, according to an illustrative embodiment.

Turning now to FIG. 2, aspects of a guided network management user experience ("user experience") 200 will be described, according to an illustrative embodiment. The illustrated user experience 200 includes the guided network management GUI 138 provided by the guided network management system 102. The guided network management GUI 138 is accessible by an operator 202 via a computer system 204. According to various implementations of the concepts and technologies disclosed herein, the computer system 204 can include a computing device, such as a tablet computing device, a personal computer ("PC"), a desktop computer, a laptop computer, a notebook computer, a cellular phone or smartphone, other mobile computing devices, a personal digital assistant ("PDA"), or the like. Example architectures of the computer system 204 are illustrated and described herein below with reference to FIGS. 6 and 7, although other architectures are contemplated.

The computer system 204 can execute an operating system 206 and one or more application programs, including a guided network management application 208. The operating system 206 is a computer program for controlling the operation of the computer system 204. The application program(s) are executable programs that can be executed on top of the operating system 206.

In some embodiments, the guided network management application 208 can be a client application for interacting with the guided network management system 102 functioning as a server. The guided network management GUI 138 is shown on the guided network management system 102, but alternatively can be made accessible via the guided network management application 208 either locally on the computer system 204 or remotely where the guided network management application 208 coordinates with the guided network management system 102 to provide the guided network management GUI 138.

The computer system 204 can be in communication with the guided network management system 102 via a wired or wireless connection, which can be a direct connection or a networked connection. The computer system 204 operates in communication with a display 210 and one or more input devices 212. The display 210 can present the guided network management GUI 138 to the operator 202. The display 210 is an output device configured to present information in a visual form. In some embodiments, the display 210 is a liquid crystal display ("LCD") utilizing any active or passive matrix technology and can utilize any backlighting technology. In some embodiments, the display 210 is an organic light emitting diode ("OLED") display. The display 210 can be embodied with other display technologies. As such, the examples provided above should not be considered limiting in any way. The input device(s) 212 can be or can include one or more touchscreens, one or more multi-touch touchscreens, one or more keyboards, one or more computer mice, one or more game controllers, one or more joysticks, one or more touchpads, one or more gesture devices (e.g., MICROSOFT KINECT, available from MICROSOFT CORPORATION), combinations thereof, or the like. The input device(s) 212 can receive input 214 from the operator 202 so that the operator 202 can interact with the guided network management GUI 138.

The illustrated guided network management GUI 138 includes a plurality of selectable options 216, which can be selected by the operator 202 via the input 214. The plurality of selectable options 216 identifies a plurality of possible modifications to at least the portion of the virtualized network 104 that would at least mitigate the network event 116 from negatively affecting the operational aspect of the virtualized network 104 in providing the service 108. In response to receiving a selection of one of the plurality of selectable options 216, the guided network management system 102 can instruct a NFVP (best shown in FIG. 3) to deploy, at least in part, the modification in the virtualized network 104.

The illustrated guided network management GUI 138 also includes interfaces through which the operator 202 can interact with specific modules of the guided network management system 102 to view data associated with operations performed by the modules of the guided network management system 102. In particular, an event interface 218 allows the operator 202 to interact with the event capture and correlation module 112; a snapshot interface 220 allows the operator 202 to interact with the snapshot module 118; a shadow network interface 222 allows the operator 202 to interact with the shadow network module 126; and an A/B testing interface 224 allows the operator 202 to interact with the A/B testing module 136.

In some embodiments, the guided network management GUI 138 generally provides a heads-up dashboard with estimated implications that allows detailed root-cause analysis for the operator 202 at different parts of the operations performed by the guided network management system 102. The heads-up dashboard can provide one or more visualizations for casting complicated network topologies and data flows into an interactive and graphically local system (e.g., via the display 210) for technicians and operators, such as the operator 202, with various breadths of responsibility.

In some embodiments, the guided network management GUI 138 can construct a different view of the shadow network 128 and/or the virtualized network 104 ("live/production network") with annotations to aid the operator 202 in understanding the root-cause of the network event 116. The guided network management GUI 138 also can allow the operator 202 to pick two different conditions (e.g., two A/B test points, such as shadow network configurations 130) and quickly compare the impacts thereof across at least a portion of the shadow network 128.

In some embodiments, the guided network management GUI 138 can present a visualization of a network topology of the shadow network 128 that the operator 202 can "zoom in" to a specific node or group of nodes to observe precise flows (e.g., the traffic flows 114 of a specific network event of the network events 116).

In some embodiments, the guided network management GUI 138 can present a comparison of options with key indicators and effects of actions display. In some embodiments, the guided network management GUI 138 can present an estimated number of nodes by automatic exploration of a network topology, the estimated traffic and effect key performance indicators ("KPI") metrics, and the results of some preemptive testing of common tasks (e.g., network probe, response latency, and the like) done during initial mitigation. Additionally, the guided network management GUI 138 also can contain similar results (e.g., KPI, measured effect, and the like) of some common actions a single actions or a set of chained actions simulating A/B testing of actions.

In some embodiments, the guided network management GUI 138 can be customized for each operator, such as the operator 202 such that his or her preferred set of mitigation actions are prioritized. For example, if operator A typically performs action M for problem X, those action sets can be preemptively evaluated or shown in a prominent location on the guided network management GUI 138.

In some embodiments, the shadow network interface 222 and the A/B testing interface 224 may combine two or more of the actions 140 from the historical action database 142 to present to the operator 202 with multiple, previously-executed actions that have proven performance for given network events of the network events 116 and/or traffic conditions represented in the traffic flows 114. More generally, the operator 202 can select from both suggested actions and historical actions through the guided management GUI 138.

Figure 3:
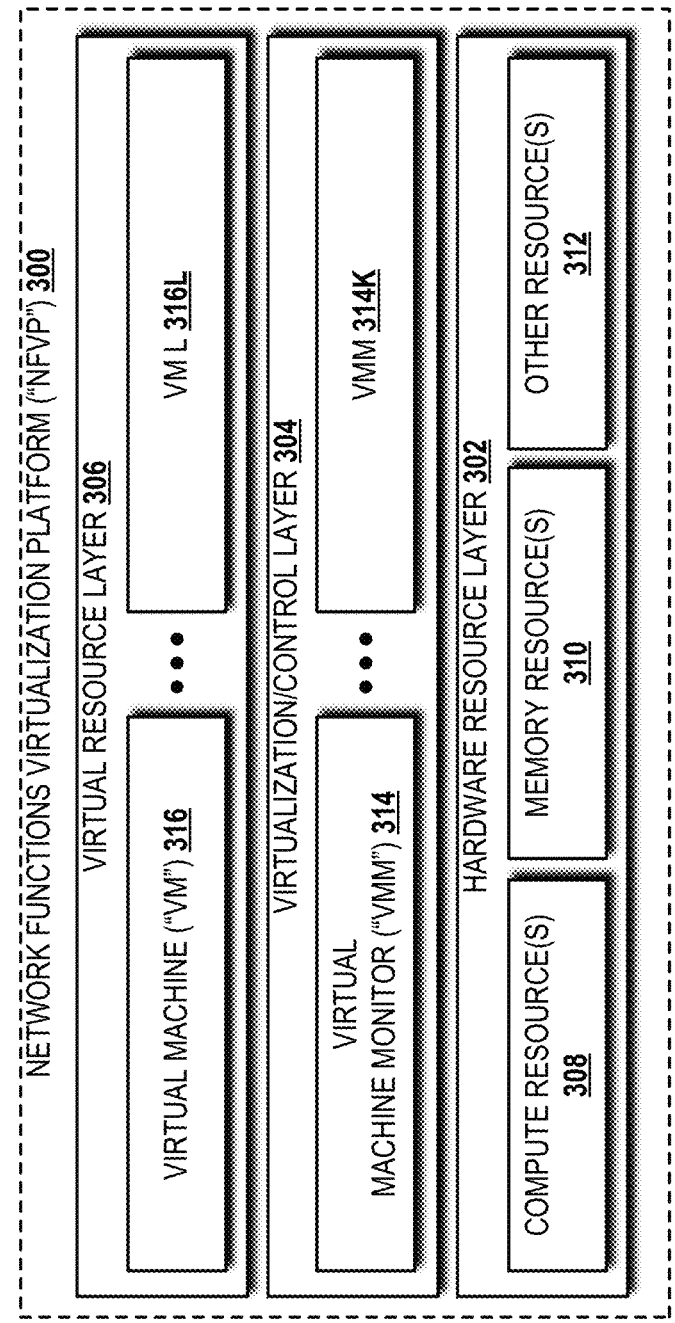
FIG. 3 is a block diagram illustrating an example network functions virtualization platform ("NFVP") capable of implementing aspects of the embodiments presented herein.

Turning now to FIG. 3, a network functions virtualization platform ("NFVP") 300 will be described, according to an exemplary embodiment. The architecture of the NFVP 300 can be used to implement the VNFs 106, the guided network management system 102, the emulated user device(s) 134, other devices and/or other systems disclosed herein, or any combination thereof. The NFVP 300 is a shared infrastructure that can support multiple services and network applications. The illustrated NFVP 300 includes a hardware resource layer 302, a virtualization/control layer 304, and a virtual resource layer 306 that work together to perform operations as will be described in detail herein.

The hardware resource layer 302 provides hardware resources, which, in the illustrated embodiment, include one or more compute resources 308, one or more memory resources 310, and one or more other resources 312. The compute resource(s) 308 can include one or more hardware components that perform computations to process data, and/or to execute computer-executable instructions of one or more application programs, operating systems, and/or other software. The compute resources 308 can include one or more central processing units ("CPUs") configured with one or more processing cores. The compute resources 308 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 308 can include one or more discrete GPUs. In some other embodiments, the compute resources 308 can include CPU and GPU components that are configured in accordance with a co-processing CPU/GPU computing model, wherein the sequential part of an application executes on the CPU and the computationally-intensive part is accelerated by the GPU. The compute resources 308 can include one or more system-on-chip ("SoC") components along with one or more other components, including, for example, one or more of the memory resources 310, and/or one or more of the other resources 312. In some embodiments, the compute resources 308 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 308 can be or can include one or more hardware components architected in accordance with an ARM architecture, available for license from ARM HOLDINGS of Cambridge, United Kingdom. Alternatively, the compute resources 308 can be or can include one or more hardware components architected in accordance with an x86 architecture, such an architecture available from INTEL CORPORATION of Mountain View, Calif., and others. Those skilled in the art will appreciate the implementation of the compute resources 308 can utilize various computation architectures, and as such, the compute resources 308 should not be construed as being limited to any particular computation architecture or combination of computation architectures, including those explicitly disclosed herein.

The memory resource(s) 310 can include one or more hardware components that perform storage operations, including temporary or permanent storage operations. In some embodiments, the memory resource(s) 310 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 308.

The other resource(s) 312 can include any other hardware resources that can be utilized by the compute resources(s) 308 and/or the memory resource(s) 310 to perform operations described herein. The other resource(s) 312 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 302 can be virtualized by one or more virtual machine monitors ("VMMs") 314-314K (also known as "hypervisors"; hereinafter "VMMs 314") operating within the virtualization/control layer 306 to manage one or more virtual resources that reside in the virtual resource layer 306. The VMMs 314 can be or can include software, firmware, and/or hardware that alone or in combination with other software, firmware, and/or hardware, manages one or more virtual resources operating within the virtual resource layer 306.

The virtual resources operating within the virtual resource layer 306 can include abstractions of at least a portion of the compute resources 308, the memory resources 310, the other resources 312, or any combination thereof. These abstractions are referred to herein as virtual machines ("VMs"). In the illustrated embodiment, the virtual resource layer 306 includes VMs 316-316N (hereinafter "VMs 316"). Each of the VMs 316 can execute one or more applications.

Figure 4:
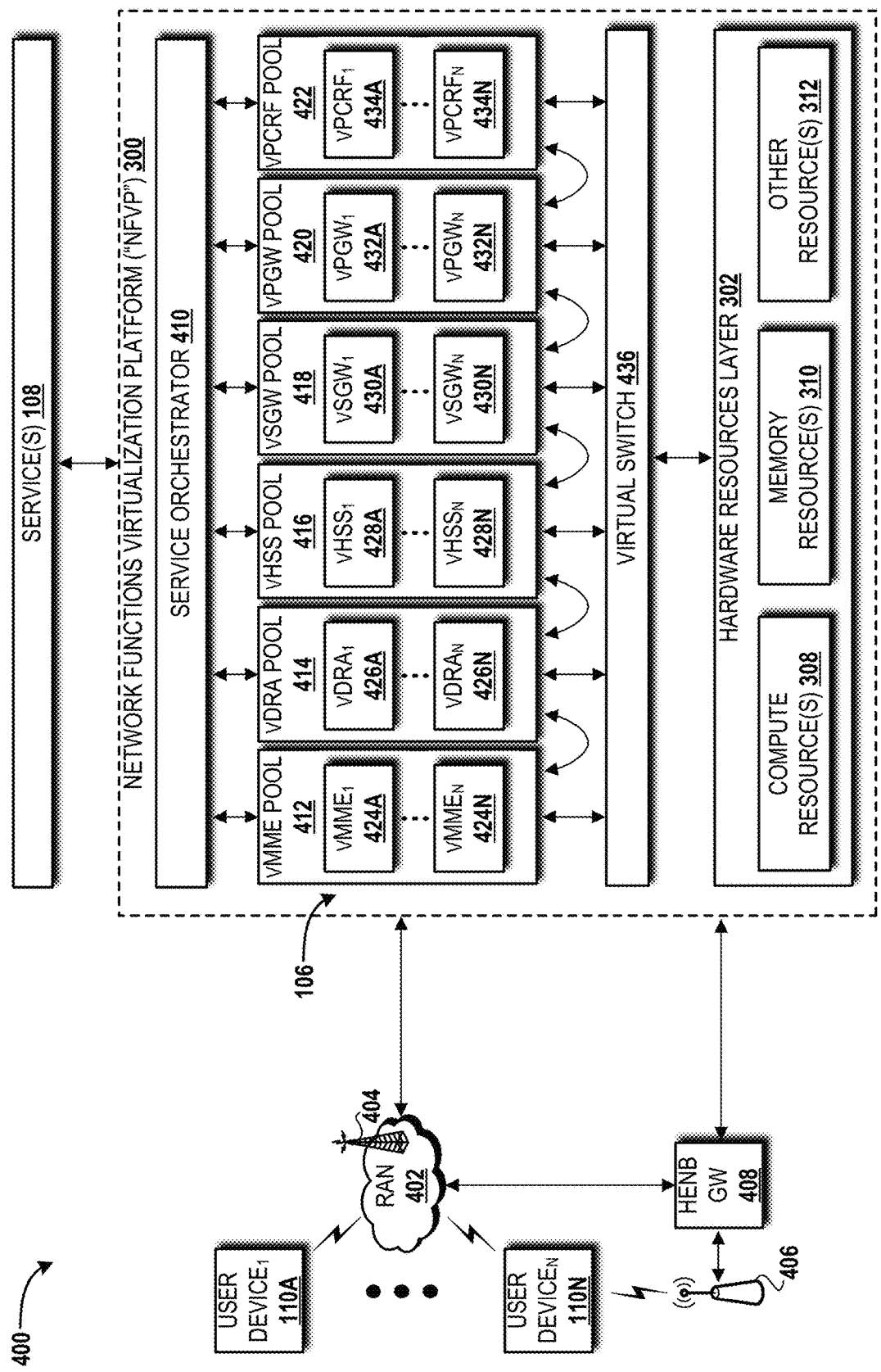
FIG. 4 is a block diagram illustrating aspects of an illustrative virtualized mobile telecommunications network in which various concepts and technologies disclosed herein can be implemented.

Turning now to FIG. 4, a block diagram illustrating aspects of an illustrative virtualized mobile telecommunications network 400 in which various concepts and technologies disclosed herein can be implemented will be described. The virtualized mobile telecommunications network 400 provides service layer orchestration, wherein physical network functions ("PNFs") associated with a network design are realized as VNFs utilizing a unified COTS hardware and flexible resources shared model with the application software running as a virtual machine.

The illustrated virtualized mobile telecommunications network 400 includes the user devices 110A-110N operating in communication with a radio access network ("RAN") 402. The user devices 110 from FIG. 1 are shown as a plurality of user devices—a first user device ("user devices") 110A through an $n^{th}$ user device ("user devicen") 110N can communicate with the RAN 402 by way of one or more eNodeBs ("eNBs"), such as an eNB 404 and/or a home eNB 406. For implementations in which a UE, such as the UEN 102N in the illustrated example, connects to the home eNB 406 for access to the RAN 402, the home eNB 406 can route to the RAN 402 via a home eNB gateway ("HeNB GW") 408. The HeNB GW 408 provides control capability to manage one or more home eNBs, such as the illustrated home eNB 406. Although the HeNB GW 408 is shown as supporting only the home eNB 406, it is contemplated that the HeNB GW 408 can support multiple home eNBs configured the same as or similar to the home eNB 406.

Likewise, although only a single eNB 404 is shown, the RAN 402 can support multiple eNBs configured the same as or similar to the eNB 404.

The RAN 402 can include one or more service areas (which may also be referred to herein as "cells") having the same or different cell sizes, which may be represented by different cell-types. As used herein, a "cell" refers to a geographical area that is served by one or more base stations operating within an access network. The cells within the RAN 402 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, a MSMC cell-type, and a white space network cell-type. For ease of explanation, a "small cell" cell-type is utilized herein to collectively refer to a group of cell-types that includes femto cell-type (e.g., home eNB 406), pico cell-type, and micro cell-type, in general contrast to a macro cell-type, which offers a larger coverage area. Other cell-types, including proprietary cell-types and temporary cell-types are also contemplated. Although in the illustrated example, the user devices 110 are shown as being in communication with one RAN (i.e., the RAN 402), the user devices 110 may be in communication with any number of access networks, including networks that incorporate collocated WWAN WI-FI and cellular technologies, and as such, the user devices 110 can be dual-mode devices.

The RAN 402 can operate in accordance with one or more mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 402 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the user devices 110. Data communications can be provided in part by the RAN 402 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 402 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 402 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 402 is or includes a virtual RAN ("vRAN").

As used herein, a "base station" refers to a radio receiver and/or transmitter (collectively, transceiver) that is/are configured to provide a radio/air interface over which one or more of the user devices 110, can connect to a network. Accordingly, a base station is intended to encompass one or more base transceiver stations ("BTSs"), one or more NBs, one or more eNBs (e.g., the eNB 406), one or more home eNBs (e.g., the home eNB 406), one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the user devices 110.

The RAN 402 is in communication with a network provided, at least in part, by a NFVP 300. The NFVP platform 300, in turn, provides the user devices 110 access to the services 108. The service(s) 108 can include any mobile telecommunications services, some examples of which include, but are not limited to, voice services (e.g., voice over IP) and data services.

The illustrated NFVP 300 includes a service orchestrator 410 that orchestrates instantiation of VNFs, monitoring of VNFs, and management of VNFs, including performance tuning as needed, to provide one or more of the services 108 to the user devices 110. More particularly, the service orchestrator 410 performs orchestration operations to control a plurality of VNF pools 412-422, each containing one or more virtual resources for a specific type of VNF. In this manner, the service orchestrator 410 provides an intelligent orchestration layer for VNF-based service chaining and resource sharing.

The plurality of VNF pools 412-422 includes a virtual MME ("vMME") pool 412, a virtual DRA ("vDRA") pool 414; a virtual HSS ("vHSS") pool 416; a virtual SGW ("vSGW") pool 418; a virtual PGW ("vPGW") pool 420; and a virtual PCRF ("vPCRF") pool 422. Each of the VNF pools 412-422 includes a corresponding one or more of the VNFs 106, which can be instantiated at the instruction of the service orchestrator 410. In particular, the vMME pool 412 includes one or more vMMEs 424A-424N; the vDRA pool 414 includes one or more vDRAs 426A-426N; the vHSS pool 416 includes one or more vHSSs 428A-428N; the vSGW pool 418 includes one or more vSGWs 430A-430N; the vPGW pool 420 includes one or more vPGWs 432A-432N; and the vPCRF pool 422 includes one or more vPCRFs 434A-434N. The service orchestrator 410, in some embodiments, can control individual VNFs independent of a VNF pool of the plurality of VNF pools 412-422. In some embodiments, separate VNF pool-specific controllers (not shown) operating under control of the service orchestrator 410 can control the VNF pools 412-422.

The vMMEs 424A-424N can perform MME PNF operations. For example, the vMMEs 424A-424N can control signaling related to mobility and security for E-UTRAN access, such as via the RAN 402, by the user devices 110, and can track and page the user devices 110 when the user devices 110 are in idle-mode. The vMMEs 424A-424N can be configured in accordance with 3GPP standards specifications.

The vDRAs 426A-426N can perform DRA PNF operations. The vDRAs 426A-426N can provide real-time routing capabilities to ensure that messages are routed among the correct elements in the network. The vDRAs 426A-426N can be configured in accordance with 3GPP standards specifications.

The vHSSs 428A-428N can perform HSS PNF operations. The vHSSs 428A-428N can include databases that contain user/subscriber information. The vHSSs 428A-428N also can perform operations to support mobility management, call and session setup, user authentication, and access authorization. The vHSSs 428A-428N can be configured in accordance with 3GPP standards specifications.

The vSGWs 430A-430N can perform SGW PNF operations. The vSGWs 430A-430N can serve the user devices 110 by routing incoming and outgoing IP packets. The vSGWs 430A-430N also can provide an anchor point for intra-LTE mobility (e.g., handover between eNodeBs operating within the RAN 402) and an anchor point between the RAN 402 and other RANs (not shown). The vSGWs 430A-430N can be configured in accordance with 3GPP standards specifications.

The vPGWs 420A-420N can perform PGW PNF operations. The vPGWs 420A-420N can interact with one or more PDNs (not shown). The PDN gateway function also performs IP address/IP prefix allocation, policy control, and charging operations. The vPGWs 420A-4202N can be configured in accordance with 3GPP standards specifications.

The vPCRFs 434A-434N can perform PCRF PNF operations. The vPCRFs 434A-424N can determine policy rules, detect service data flows, enforce policies, and perform flow-based charging. The vPCRFs 434A-434N can be configured in accordance with 3GPP standards specifications.

Each of the VNF pools 412-422 is in communication with a virtual switch 436. The virtual switch 436 can be a virtual multilayer switch that provides a switching stack for the NFVP 300. In some embodiments, the virtual switch 436 is an OPEN VSWITCH, available from openvswitch.org. In some embodiments, the virtual switch 436 is a proprietary virtual network switch implementation.

The virtual switch 436 operates in communication with the hardware resources layer 302. The hardware resources layer 302 provides hardware resources, which, in the illustrated embodiment, include the compute resources 308, one or more memory resources 310, and one or more other resources 312.

The service orchestrator 410 can continuously monitor the virtual resources in the VNF pools 412-422. Besides inter-VNF communication, the service orchestrator 410 continuously monitors each of the VNFs across the VNF pools 412-422 and ensures that the correct VNFs are instantiated and selected for a given service requested by one or more of the user devices 110. For example, if a user of one of the user devices 110 needs to be served with LTE-broadcast, the service orchestrator 410 can assign a set of core network virtual resources from the VNF pools 412-422 to handle the broadcast service. Once the service has been delivered and completed, the VNFs are released and can be followed by a report generation for such service.

The service orchestrator 410 ensures radio spectrum and core network resources, simultaneous voice/video/data/messaging, multi-party conferencing services, and the like are effectively served and utilized so that legacy (e.g., 3G and 2G) systems can be retired quickly and the associated spectrum re-used for emerging wireless technologies (e.g., 6G) in delivering enhanced services to mobile consumers with rich multimedia services over a virtualized network infrastructure in a data center.

When the user device 110 moves out of a LTE coverage area, the service orchestrator 410 can monitor user-service fall back to underlying legacy network and ensure that its service is fully met while the user device 110 is served by the legacy infrastructure that may not be virtualized in the operator's network. Tighter integration of the 3G network management systems with the service orchestrator 410 can ensure such a reliable monitoring and assurance engine is in place to minimize subscriber churn when associated with dynamic user mobility patterns in the network.

The service orchestrator 410 not only facilitates in the orchestration of various mobility core network components in the end-to-end signaling data path once the user device 110 attaches into the network via an MME, such as one of the vMMEs 412, as the entry point in the network, but also considers the source of the attach request—that is, whether the attach request originates from a service macro eNB, such as the eNB 404, or a small cell eNB, such as the home eNB 406, via the HeNB GW 408.

Figure 5:
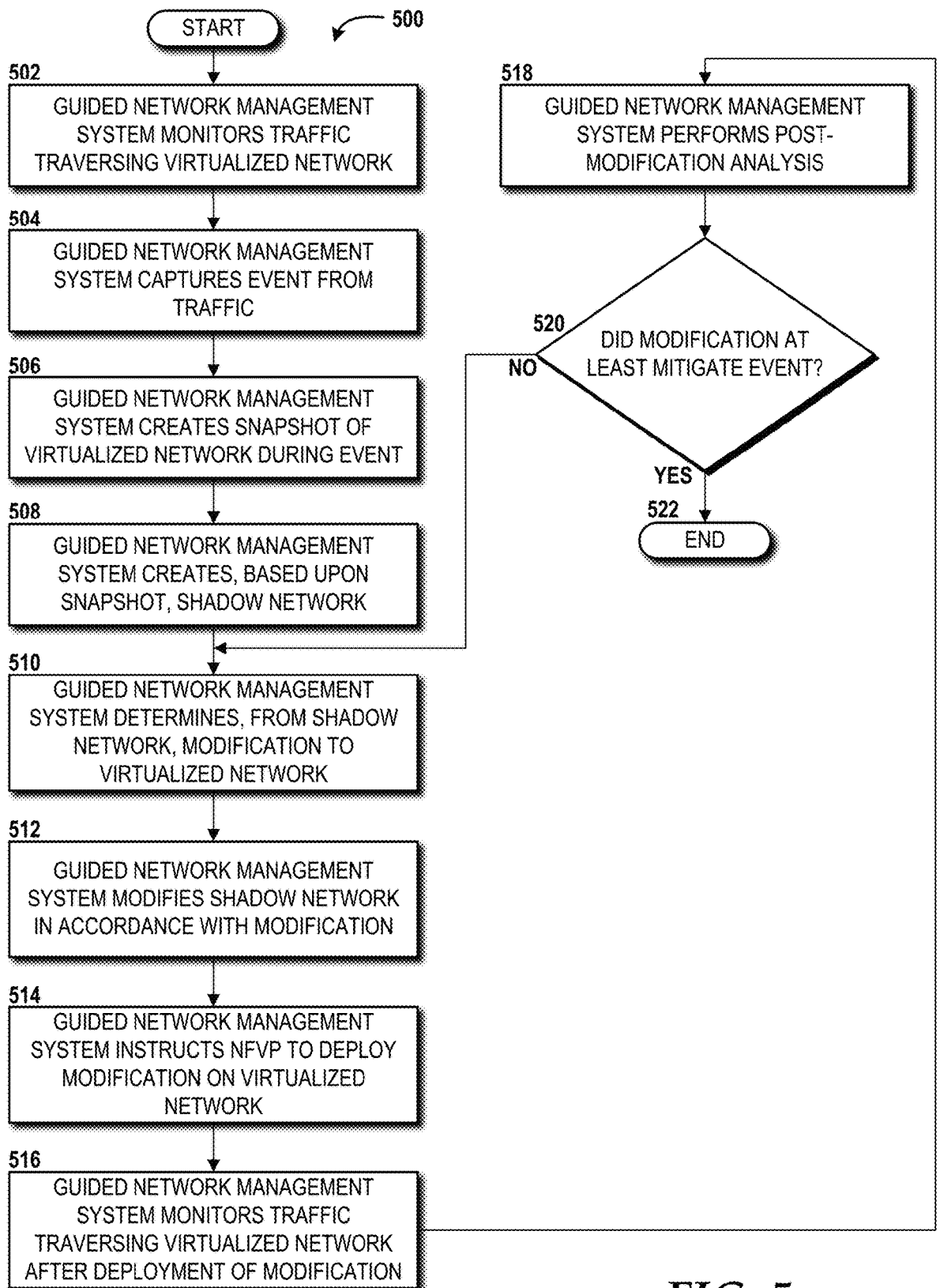
FIG. 5 is a flow diagram illustrating a method for guided network management, according to an illustrative embodiment.

Turning now to FIG. 5, aspects of a method 500 for guided network management will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the guided network management system 102, the user device(s) 110, the NFVP 300 (e.g., the compute resource(s) 308), the computer system 204, and/or a processor one or more other computing systems and/or devices disclosed herein to perform operations.

For purposes of illustrating and describing some of the concepts of the present disclosure, the methods disclosed herein are described as being performed, at least in part, by the guided network management system 102 via execution of one or more software modules, such as the event capture and correlation module 112, the snapshot module 118, the shadow network module 126, the A/B testing module 136, the guided network management GUI 138, or some combination thereof. It should be understood that additional and/or alternative systems, devices and/or network nodes can provide the functionality described herein via execution of one or more modules, applications, and/or other software. Thus, the illustrated embodiments are illustrative, and should not be viewed as being limiting in any way.

The method 500 will be described with reference to FIG. 5 and further reference to FIGS. 1-4 for context. The method 500 begins and proceeds to operation 502, where the guided network management system 102 monitors the traffic 114 traversing the virtualized network 104. In some embodiments, the guided network management system 102 monitors the traffic 114 via one or more network probes. The network probes can be deployed at various locations within the virtualized network 104, such as integrated within one or more of the VNFs 106, provided separately as a standalone network probe VNF of the VNFs 106, hardware probes, software probes, and/or other network monitoring technologies known to those skilled in the art. In some embodiments, one or more of the aforementioned network probes are managed, at least in part, by the event capture and correlation module 112. Alternatively, the network probe(s) can be managed by another component, such as a dedicated network probe management system, which can then communicate with the event capture and correlation module 112 regarding the traffic 114.

From operation 502, the method 500 proceeds to operation 504, where the guided management system 102 captures an event 116 from the traffic 114. As described above, the event 116 is a network occurrence of significance to one or more operational aspects of the virtualized network 104. The guided management system 102 can capture the event 116 via execution of instructions of the event capture and correlation module 112.

From operation 504, the method 500 proceeds to operation 506, where the guided management system 102 creates a snapshot 120 of the virtualized network 104 during the event 116. The snapshot 120 can be created based upon a network data buffer of network data associated with the event 116. The network data buffer can include network data associated with the event 116 from the start of the event 116 to the end of the event 116. It is contemplated that additional buffer before the start time and/or after the end time of the event 116 can be used to capture any residual effects of the event 116 on the traffic 114. In some embodiments, the additional buffer can be set by the operator 202. Alternatively, the additional buffer can be automatically applied based upon historical data associated with one or more events similar to the event for which the snapshot 120 is created. For example, if a given event type often causes an residual effect that reduces network bandwidth on a particular link or group of links, the guided management system 102 can correlate the event 116 captured at operation 504 to the event types known to the guided management system 102 based upon previously network analyses to determine the additional buffer needed to capture the residual effect.

The guided management system 102 can create the snapshot 120 of the virtualized network 104 during the event 116 via execution of instructions of the snapshot module 118.

From operation 506, the method 500 proceeds to operation 508, where the guided management system 102 creates, based upon the snapshot 120 created at operation 506, a shadow network 128. The guided management system 102 can create the shadow network 128 via execution of the shadow network module 126. In some embodiments, the shadow network 128 is created from scratch, and the configuration of this new shadow network can be stored in the shadow network database 132. In other embodiments, the shadow network 128 can be created based upon one or more of the shadow network configurations stored in the shadow network database 132. The shadow network module 126 alternatively can use an active shadow network configuration upon which to create the shadow network 128 via one or more modifications to the active shadow network configuration. Another alternative is the implementation of multiple shadow networks 128 that can be created and managed in parallel based upon multiple snapshots 120 created in response to multiple events 116.

From operation 508, the method 500 proceeds to operation 510, where the guided management system 102 determines, from the shadow network 128, one or more modifications to the virtualized network 104 that would at least mitigate the event 116 from negatively affecting one or more operational aspects of the virtualized network 104 in providing the service 108. In some embodiments, the operator 202 can manipulate one or more parameters of the modification(s) based upon his/her own analysis of the event 116 or other factors, such as instructions received post-event or to address regulatory parameters not presently implemented in the shadow network module 126.

From operation 510, the method 500 proceeds to operation 512, where the guided network management system 102 modifies the shadow network 128 in accordance with the modification(s) determined at operation 510. The modification(s) to the shadow network 128 allow the operator 202 to view changes of network behavior responsive to the event 116 should the same or similar event(s) occur in the future prior to deploying the modification(s) on the virtualized network 104, which operates in a production environment.

From operation 512, the method 500 proceeds to operation 514, where the guided network management system 102 instructs the NFVP 300 to deploy the modification(s) on the virtualized network 104. From operation 514, the method 500 proceeds to operation 516, where the guided network management system 102 can monitor the traffic 114 traversing the virtualized network 104 after deployment of the modification(s) on the virtualized network 104.

From operation 516, the method 500 proceeds to operation 518, where the guided network management system 102 can perform post-modification analysis on the virtualized network 104. The post-modification analysis can include the event capture and correlation module 112 capturing sample events, which are not triggered by any negative affect on one or more operational aspects of the virtualized network 104 in providing the service 108, but rather might be taken at random or pre-defined times (e.g., during peak network usage hours). The event capture and correlation module 112 can capture a sample event in response to a request from the operator 202.

From operation 518, the method 500 proceeds to operation 520, where the guided network management system 102 determines if the modification(s) at least mitigated the occurrence of an event having characteristics the same as or similar to those of the event 116 captured at operation 504. If the guided network management system 102 determines that the modification(s) at least mitigated occurrence of an event having characteristics the same as or similar to those of the event 116 captured at operation 504, the method 500 proceeds to operation 522, where the method 500 ends. If, however, the guided network management system 102 determines that the modification(s) do not at least mitigate occurrence of an event having characteristics the same as or similar to those of the event 116 captured at operation 504, the method returns to operation 510, where the guided network management system can determine one or more further modifications to be made to the virtualized network 104 to correct the failed modification(s).

The post-modification analysis can be provided as an ongoing service of the guided network management system 102 until termination is requested, for example, by the operator 202. Alternatively, the post-modification analysis might be terminated in response to the event capture and correlation module 112 the traffic 114 not exhibiting characteristics of the event 116 for a time period, a certain number of traffic flows having patterns similar to those of before and/or after occurrence of the event 116.

Figure 6:
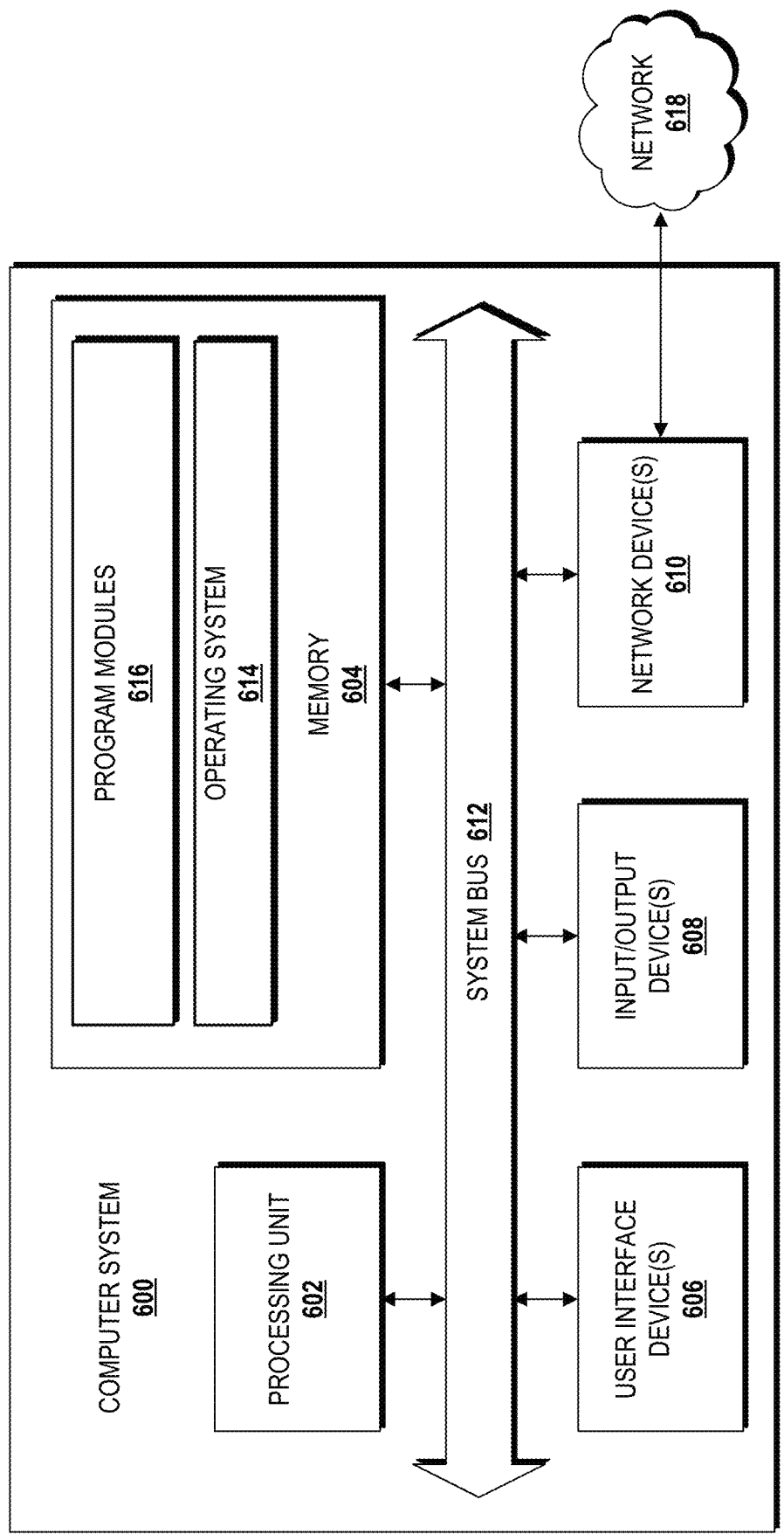
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some implementations, the guided network management system 102 (illustrated in FIG. 2) includes one or more computers that are configured like the architecture of the computer system 600. In some implementations, the computer system 204 (illustrated in FIG. 2) includes one or more computers that are configured like the architecture of the computer system 600. In some implementations, the hardware resource layer 302 (illustrated in FIG. 3) includes one or more computers that are configured like the architecture of the computer system 600. The computer system 600 may provide at least a portion of the compute resources 308, the memory resources 310, and/or the other resources 312. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 604 communicates with the processing unit 602 via the system bus 612. In some embodiments, the memory 604 is operatively connected to a memory controller (not shown) that enables communication with the processing unit 602 via the system bus 612. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof. In some embodiments, the program modules 616 can particularly include the event capture and correlation module 112, the snapshot module 118, the shadow network module 126, the A/B testing module 136, and/or the guided network management GUI 138.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618. Examples of the network devices 610 include, but are not limited to, a modem, a radio frequency ("RF") or infrared ("IR") transceiver, a telephonic interface, a bridge, a router, or a network card. The network 618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be or may include a wired network such as, but not limited to, a Wide Area Network ("WAN"), a wired Personal Area Network ("PAN"), or a wired Metropolitan Area Network ("MAN").

Figure 7:
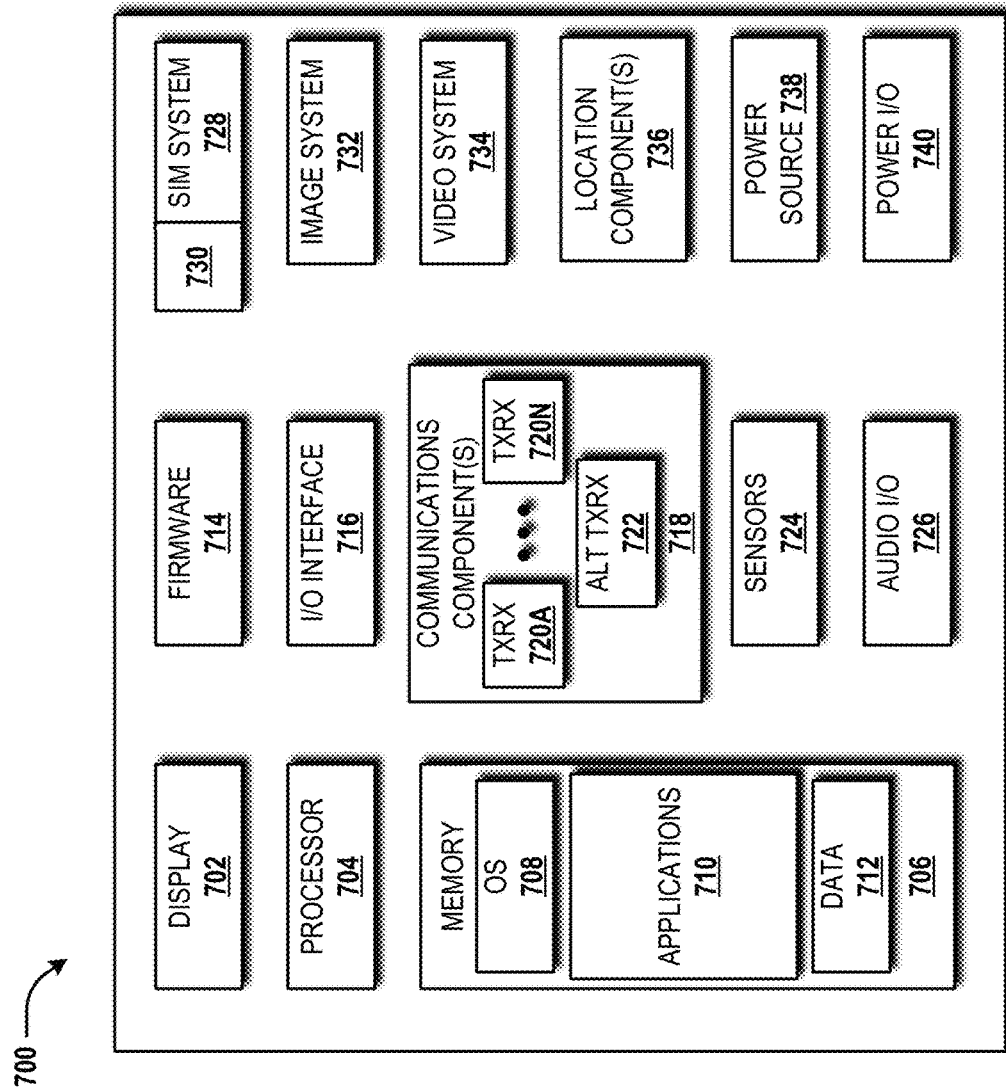
FIG. 7 is a block diagram illustrating an example mobile device capable of implementing aspects of the embodiments disclosed herein.

Turning now to FIG. 7, an illustrative mobile device 700 and components thereof will be described. In some embodiments, one or more of the user devices 110 (shown in FIG. 1) can be configured like the mobile device 700. In some embodiments, the computer system 204 can be configured like the mobile device 700. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710, other computer-executable instructions stored in a memory 706, or the like. In some embodiments, the applications 710 also can include a user interface ("UI") application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, one or more identifiers, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1394 ("FIREWIRE") port, a serial port, a parallel port, an Ethernet (RJ46) port, an RJ10 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using Global System for Mobile communications ("GSM"), Code Division Multiple Access ("CDMA") ONE, CDMA2000, Long-Term Evolution ("LTE"), and various other 2G, 2.6G, 3G, 4G, and greater generation technology standards. Moreover, the communications component 718 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 718 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-720N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
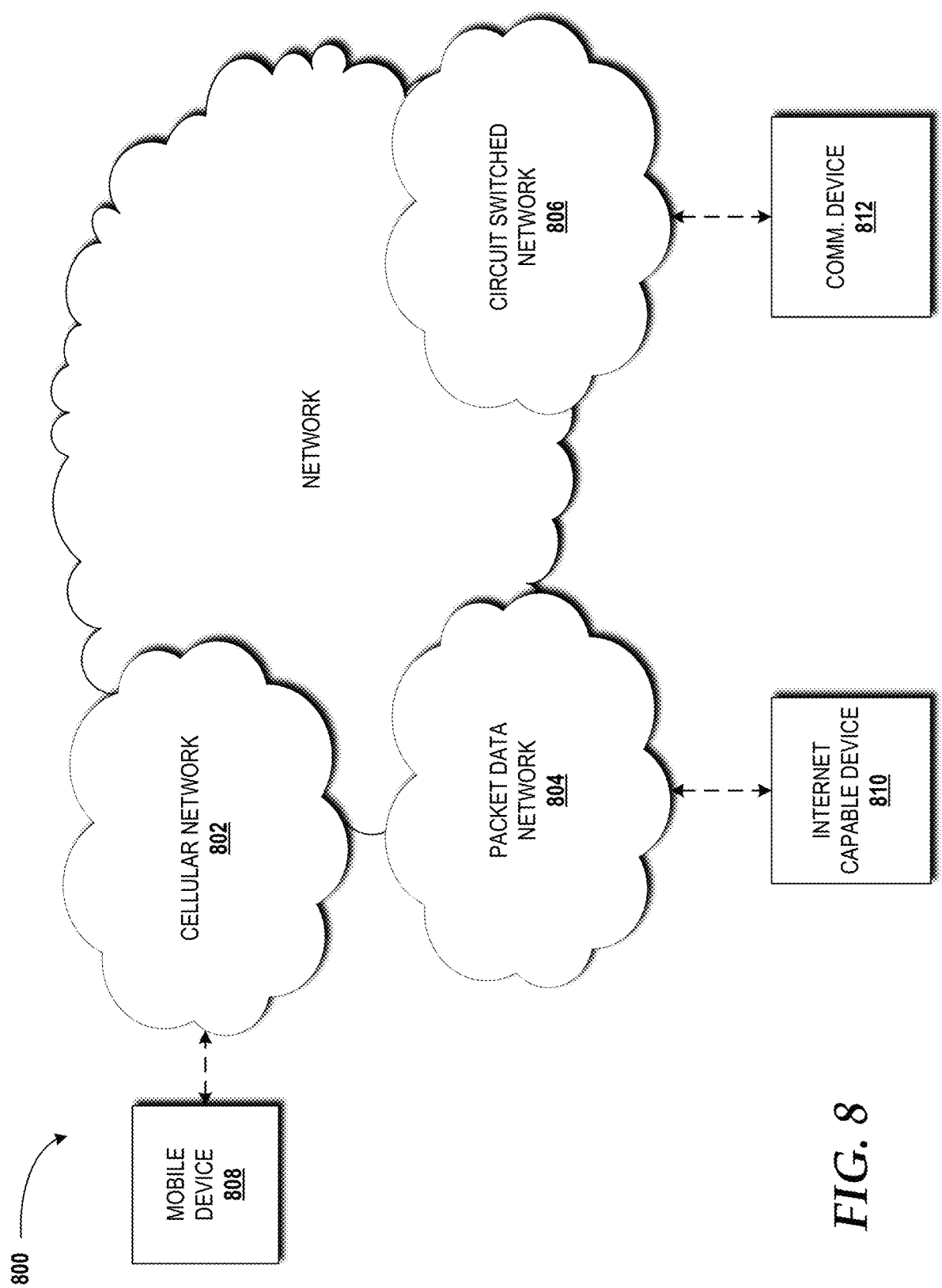
FIG. 8 is a block diagram illustrating an example network capable of implementing aspects of the embodiments presented herein.

Turning now to FIG. 8, details of a network 800 are illustrated, according to an illustrative embodiment. The network 800 includes a cellular network 802, a packet data network 804, for example, the Internet, and a circuit switched network 806, for example, a PSTN. The cellular network 802 includes various components such as, but not limited to, base transceiver stations ("BTSs"), NBs or eNBs (e.g., the eNB 404 and the home eNB 406), base station controllers ("BSCs"), radio network controllers ("RNCs"), mobile switching centers ("MSCs"), MMEs, short message service centers ("SMSCs"), multimedia messaging service centers ("MMSCs"), home location registers ("HLRs"), HSSs, VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, the user device(s) 110 embodied as the mobile device 700, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards such as LTE, or the like, as well as evolved and future mobile standards.

The packet data network 804 includes various devices, for example, servers, computers, databases, and other devices in communication with another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a POTS. The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810.

Figure 9:
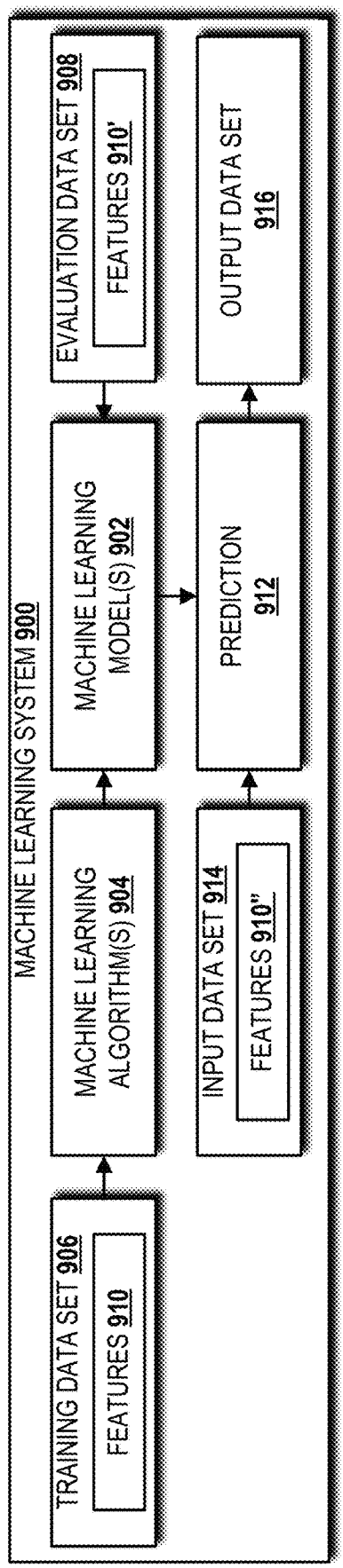
FIG. 9 is a block diagram illustrating an example machine learning system capable of implementing aspects of the embodiments presented herein.

Turning now to FIG. 9, a machine learning system 900 capable of implementing aspects of the embodiments disclosed herein will be described. In some embodiments, the machine learning system 900 is provided as a software system executed, at least in part, by one or more processors of the guided network management system 102. Alternatively, the machine learning system 900 can be external to the guided network management system 102 and can be made accessible either locally (e.g., via a local area network or "LAN") or remotely, whereby the machine learning system 900 operates, for example, off-site, such as in a cloud computing network, a server host, or the like.

The illustrated machine learning system 900 includes one or more machine learning models 902. The machine learning model(s) 902 can be created by the machine learning system 900 based upon one or more machine learning algorithms 904. The machine learning algorithm(s) 904 can be any existing, well-known algorithm, any proprietary algorithms, or any future machine learning algorithm. Some example machine learning algorithms 904 include, but are not limited to, gradient descent, linear regression, logistic regression, linear discriminant analysis, classification tree, regression tree, Naive Bayes, K-nearest neighbor, learning vector quantization, support vector machines, and the like. Those skilled in the art will appreciate the applicability of various machine learning algorithms 904 based upon the problem(s) to be solved by machine learning via the machine learning system 900.

The machine learning system 900 can control the creation of the machine learning models 902 via one or more training parameters. In some embodiments, the training parameters are selected by one or more users, such as the operator 202 (shown in FIG. 2). Alternatively, in some embodiments, the training parameters are automatically selected based upon data provided in one or more training data sets 906. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 904 converges to the optimal weights. The machine learning algorithm 904 can update the weights for every data example included in the training data set 906. The size of an update is controlled by the learning rate. A learning rate that is too high might prevent the machine learning algorithm 904 from converging to the optimal weights. A learning rate that is too low might result in the machine learning algorithm 904 requiring multiple training passes to converge to the optimal weights.

The model size is regulated by the number of input features ("features") 910 in the training data set 906. A greater the number of features 910 yields a greater number of possible patterns that can be determined from the training data set 906. The model size should be selected to balance the resources (e.g., compute, memory, storage, etc.) needed for training and the predictive power of the resultant machine learning model 902.

The number of training passes indicates the number of training passes that the machine learning algorithm 904 makes over the training data set 906 during the training process. The number of training passes can be adjusted based, for example, on the size of the training data set 906, with larger training data sets being exposed to fewer training passes in consideration of time and/or resource utilization. The effectiveness of the resultant machine learning model 902 can be increased by multiple training passes.

Data shuffling is a training parameter designed to prevent the machine learning algorithm 904 from reaching false optimal weights due to the order in which data contained in the training data set 906 is processed. For example, data provided in rows and columns might be analyzed first row, second row, third row, etc., and thus an optimal weight might be obtained well before a full range of data has been considered. By data shuffling, the data contained in the training data set 906 can be analyzed more thoroughly and mitigate bias in the resultant machine learning model 902.

Regularization is a training parameter that helps to prevent the machine learning model 902 from memorizing training data from the training data set 906. In other words, the machine learning model 902 fits the training data set 906, but the predictive performance of the machine learning model 902 is not acceptable. Regularization helps the machine learning system 900 avoid this overfitting/memorization problem by adjusting extreme weight values of the features 910. For example, a feature that has a small weight value relative to the weight values of the other features in the training data set 906 can be adjusted to zero.

The machine learning system 900 can determine model accuracy after training by using one or more evaluation data sets 908 containing the same features 910' as the features 910 in the training data set 906. This also prevents the machine learning model 902 from simply memorizing the data contained in the training data set 906. The number of evaluation passes made by the machine learning system 900 can be regulated by a target model accuracy that, when reached, ends the evaluation process and the machine learning model 902 is considered ready for deployment.

After deployment, the machine learning model 902 can perform prediction 912 with an input data set 914 having the same features 910" as the features 910 in the training data set 906 and the features 910' of the evaluation data set 908. The results of the prediction 912 are included in an output data set 916 consisting of predicted data.

Based on the foregoing, it should be appreciated that concepts and technologies directed to guided network management have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A guided network management system comprising:
a processor; and
memory having instructions stored thereon that, when executed by the processor, cause the processor to perform operations comprising
monitoring traffic traversing a virtualized network, wherein the virtualized network comprises a plurality of virtual network functions that provide, at least in part, a service to a user device,
capturing an event from the traffic, wherein the event involves the user device and at least one virtual network function of the plurality of virtual network functions, and wherein the event negatively affects an operational aspect of the virtualized network in providing the service,
creating a snapshot of the virtualized network, wherein the snapshot represents a network state of the virtualized network during the event, and wherein the snapshot further represents a user device state of the user device during the event,
creating, based upon the snapshot, a shadow network, wherein the shadow network comprises a network emulation of the network state of the virtualized network during the event,
creating, based upon the snapshot, a user device emulation based upon the user device state, and
determining, from the shadow network, a modification to at least a portion of the virtualized network that would at least mitigate the event from negatively affecting the operational aspect of the virtualized network in providing the service, wherein determining, from the shadow network, the modification to at least the portion of the virtualized network comprises performing an A/B test, wherein the shadow network emulating the network state of the virtualized network is compared to the shadow network emulating a modified network state of the virtualized network comprising the network state modified by the modification.

2. The guided network management system of claim 1, wherein determining, from the shadow network, the modification to at least the portion of the virtualized network that would at least mitigate the event from negatively affecting the operational aspect of the virtualized network in providing the service further comprises determining, based, at least in part, upon a machine learning process, a further modification to at least the portion of the virtualized network that would at least mitigate the event from negatively affecting the operational aspect of the virtualized network in providing the service.

3. The guided network management system of claim 1, wherein the operations further comprise:
presenting, via a graphical user interface, a selectable option of a plurality of selectable options, wherein the plurality of selectable options identifies a plurality of possible modifications to at least the portion of the virtualized network that would at least mitigate the event from negatively affecting the operational aspect of the virtualized network in providing the service, and wherein the selectable option specifically identifies the modification;
receiving, via the graphical user interface, a selection of the selectable option from the plurality of selectable options; and
in response to the selection, instructing a network functions virtualization platform to deploy, at least in part, the modification in the virtualized network.

4. The guided network management system of claim 3, wherein the operations further comprise creating a further snapshot of the virtualized network after deployment of the modification to the virtualized network.

5. A method comprising:
monitoring, by a guided network management system comprising a processor, traffic traversing a virtualized network, wherein the virtualized network comprises a plurality of virtual network functions that provide, at least in part, a service to a user device;
capturing, by the guided network management system, an event from the traffic, wherein the event involves the user device and at least one virtual network function of the plurality of virtual network functions, and wherein the event negatively affects an operational aspect of the virtualized network in providing the service;
creating, by the guided network management system, a snapshot of the virtualized network, wherein the snapshot represents a network state of the virtualized network during the event;
creating, by the guided network management system, based upon the snapshot, a shadow network, wherein the shadow network comprises a network emulation of the network state of the virtualized network during the event, and wherein the snapshot further represents a user device state of the user device during the event;
creating, based upon the snapshot, a user device emulation based upon the user device state; and
determining, by the guided network management system, from the shadow network, a modification to at least a portion of the virtualized network that would at least mitigate the event from negatively affecting the operational aspect of the virtualized network in providing the service, wherein determining, from the shadow network, the modification to at least the portion of the virtualized network comprises performing an A/B test, wherein the shadow network emulating the network state of the virtualized network is compared to the shadow network emulating a modified network state of the virtualized network comprising the network state modified by the modification.

6. The method of claim 5, further comprising:
presenting, by the guided network management system, via a graphical user interface, a selectable option of a plurality of selectable options, wherein the plurality of selectable options identifies a plurality of possible modifications to at least the portion of the virtualized network that would at least mitigate the event from negatively affecting the operational aspect of the virtualized network in providing the service, and wherein the selectable option specifically identifies the modification;

receiving, via the graphical user interface, a selection of the selectable option from the plurality of selectable options; and in response to the selection, instructing a network functions virtualization platform to deploy, at least in part, the modification in the virtualized network.

7. The method of claim 6, further comprising creating a further snapshot of the virtualized network after deployment of the modification to the virtualized network.

8. The method of claim 5, wherein determining, by the guided network management system, from the shadow network, the modification to at least the portion of the virtualized network that would at least mitigate the event from negatively affecting the operational aspect of the virtualized network in providing the service further comprises determining, based, at least in part, upon a machine learning process, a further modification to at least the portion of the virtualized network that would at least mitigate the event from negatively affecting the operational aspect of the virtualized network in providing the service.

9. A computer-readable storage medium comprising computer-executable instructions that, when executed by a processor, cause the processor to perform operations comprising:

monitoring traffic traversing a virtualized network, wherein the virtualized network comprises a plurality of virtual network functions that provide, at least in part, a service to a user device;

capturing an event from the traffic, wherein the event involves the user device and at least one virtual network function of the plurality of virtual network functions, and wherein the event negatively affects an operational aspect of the virtualized network in providing the service;

creating a snapshot of the virtualized network, wherein the snapshot represents a network state of the virtualized network during the event;

creating, based upon the snapshot, a shadow network, wherein the shadow network comprises a network emulation of the network state of the virtualized network during the event, and wherein the snapshot further represents a user device state of the user device during the event;

creating, based upon the snapshot, a user device emulation based upon the user device state; and determining, from the shadow network, a modification to at least a portion of the virtualized network that would at least mitigate the event from negatively affecting the operational aspect of the virtualized network in providing the service, wherein determining, from the shadow network, the modification to at least the portion of the virtualized network comprises performing an A/B test, wherein the shadow network emulating the network state of the virtualized network is compared to the shadow network emulating a modified network state of the virtualized network comprising the network state modified by the modification.

10. The computer-readable storage medium of claim 9, wherein the operations further comprise:

presenting, via a graphical user interface, a selectable option of a plurality of selectable options, wherein the plurality of selectable options identifies a plurality of possible modifications to at least the portion of the virtualized network that would at least mitigate the event from negatively affecting the operational aspect of the virtualized network in providing the service, and wherein the selectable option specifically identifies the modification;

receiving, via the graphical user interface, a selection of the selectable option from the plurality of selectable options; and in response to the selection, instructing a network functions virtualization platform to deploy, at least in part, the modification in the virtualized network.

11. The computer-readable storage medium of claim 10, wherein the operations further comprise creating a further snapshot of the virtualized network after deployment of the modification to the virtualized network.

12. The computer-readable storage medium of claim 9, wherein determining, from the shadow network, the modification to at least the portion of the virtualized network that would at least mitigate the event from negatively affecting the operational aspect of the virtualized network in providing the service further comprises determining, based, at least in part, upon a machine learning process, a further modification to at least the portion of the virtualized network that would at least mitigate the event from negatively affecting the operational aspect of the virtualized network in providing the service.

* * * * *